(12) United States Patent
Liu et al.

(10) Patent No.: US 12,063,097 B2
(45) Date of Patent: Aug. 13, 2024

(54) ELECTRONIC DEVICE, WIRELESS COMMUNICATION METHOD, AND COMPUTER READABLE MEDIUM

(71) Applicant: Sony Group Corporation, Tokyo (JP)

(72) Inventors: Min Liu, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 255 days.

(21) Appl. No.: 17/615,833

(22) PCT Filed: Jul. 2, 2020

(86) PCT No.: PCT/CN2020/099806
§ 371 (c)(1),
(2) Date: Dec. 2, 2021

(87) PCT Pub. No.: WO2021/004357
PCT Pub. Date: Jan. 14, 2021

(65) Prior Publication Data
US 2022/0329314 A1 Oct. 13, 2022

(30) Foreign Application Priority Data
Jul. 8, 2019 (CN) .......................... 201910609787.4

(51) Int. Cl.
*H04B 7/185* (2006.01)
*H04W 8/22* (2009.01)
(Continued)

(52) U.S. Cl.
CPC ..... *H04B 7/18513* (2013.01); *H04B 7/18517* (2013.01)

(58) Field of Classification Search
CPC ............ H04B 7/18513; H04B 7/18517; H04B 7/18519; H04W 52/146; H04W 52/248;
(Continued)

(56) References Cited

U.S. PATENT DOCUMENTS

2001/0001764 A1   5/2001 Davarian et al.
2004/0146024 A1*  7/2004 Li ....................... H04B 7/0851
                                                    375/E1.027
(Continued)

FOREIGN PATENT DOCUMENTS

CN         1276110 A      12/2000
CN       104486041 A       4/2015
(Continued)

OTHER PUBLICATIONS

3GPP TSG RAN WG1 Meeting, RAN1#96bis R1-1904225, tsgr1_96b, Mar. 29, 2019, Fraunhofer IIS, Fraunhofer HHI,R1-1904225 "Timing Advance 3104012021.10 Adjustments for Satellite Communications (NTN)", full text.
(Continued)

*Primary Examiner* — Inder P Mehra
(74) *Attorney, Agent, or Firm* — XSENSUS LLP

(57) ABSTRACT

The present invention relates to an electronic device, a wireless communication method, and a computer readable medium. The electronic device for wireless communication according to one embodiment comprises a processing circuit. The processing circuit is configured to determine, according to the capability of a user equipment and/or a channel situation between the user equipment and a base station for non-terrestrial network communication, an uplink transmission mode for the user equipment from two or more uplink transmission modes respectively corresponding to different acquisition manners of an uplink transmission parameter. The processing circuit is further configured to
(Continued)

perform control so as to perform uplink transmission from the user equipment to the base station on the basis of the determined uplink transmission mode.

18 Claims, 11 Drawing Sheets

(51) Int. Cl.
*H04W 52/14* (2009.01)
*H04W 52/24* (2009.01)
*H04W 52/28* (2009.01)
*H04W 84/06* (2009.01)

(58) Field of Classification Search
CPC ... H04W 52/283; H04W 8/22; H04W 52/285; H04W 52/288; H04W 84/06; H04W 52/247; H04W 52/42; H04W 56/0045; H04W 24/02; H04W 56/0005; H04W 88/06
USPC .......................................................... 370/316
See application file for complete search history.

(56) References Cited

U.S. PATENT DOCUMENTS

| | | | |
|---|---|---|---|
| 2010/0142455 | A1 | 6/2010 | Imamura |
| 2011/0310759 | A1* | 12/2011 | Gerstenberger ........ H04L 5/001 370/252 |
| 2012/0020231 | A1* | 1/2012 | Chen ................... H04W 72/541 370/252 |

FOREIGN PATENT DOCUMENTS

| | | |
|---|---|---|
| CN | 105307254 A | 2/2016 |
| CN | 106575992 A | 4/2017 |
| CN | 108401299 A | 8/2018 |
| CN | 109525299 A | 3/2019 |
| CN | 109548071 A | 3/2019 |
| CN | 109936401 A | 6/2019 |
| EP | 0934635 A | 8/1999 |
| GB | 2576203 A | 2/2020 |
| JP | 2001502510 A | 2/2001 |
| WO | WO-2016173494 A1 | 11/2016 |
| WO | WO-2017167024 A1 | 10/2017 |
| WO | WO-2019097922 A1 | 5/2019 |

OTHER PUBLICATIONS

Fraunhofer Iis et al: "Timing Advance Adjustments for Satellite Communications (NTN)", 3GPP Draft; R1-1904225-TA Adjustments for NTN, 3rd Generation Partnership Project (3GPP), Mobile Competence Centre ; 650, Route Des Lucioles ; F-06921 Sophia-Antipolis Cedex ; France vol. RAN WG1, No. Xi'an, China; Apr. 8, 2019-Apr. 12, 2019 Apr. 7, 2019 (Apr. 7, 2019), XP051699552.
Thales: "New Study Item on solutions evaluation for NR to support Non Terrestrial Network", 3GPP Draft; RP-180182_2ND SID NR-NTN_V37, 3rd Generation Partnership Project (3GPP), Mobile Competence Centre ; 650, Route Des Lucioles ; F-06921 Sophia-Antipolis Cedex ; France vol. TSG RAN, No. Chennai, India; Mar. 19, 2018-Mar. 22, 2018 Mar. 12, 2018 (Mar. 12, 2018), XP051508982.
International Search Report and Written Opinion mailed on Sep. 23, 2020, received for PCT Application PCT/CN2020/099806, Filed on Jul. 2, 2020, 8 pages including English Translation.
CATT, Prach design and UL timing advance[ online] , 3GPP TSG RAN WG1 #97 R1-1906325 , Internet <URL: https://www.3gpp.org/ftp/tsg_ran/WG1_RL1/TSGR1_97/Docs/R1-1906325.zip>, 201.

* cited by examiner

ELECTRONIC DEVICE, WIRELESS COMMUNICATION METHOD, AND COMPUTER READABLE MEDIUM

CROSS-REFERENCE TO RELATED APPLICATIONS

The present application is based on PCT filing PCT/CN2020/099806, filed Jul. 2, 2020, which claims the priority to Chinese Patent Application No. 201910609787.4 titled "ELECTRONIC DEVICE, WIRELESS COMMUNICATION METHOD, AND COMPUTER READABLE MEDIUM", filed on Jul. 8, 2019 with the China National Intellectual Property Administration (CNIPA), each of which is incorporated herein by reference in its entirety.

FIELD

The present disclosure generally relates to the technical field of wireless communications, in particular to an electronic device for a non-terrestrial networks (NTN) communication, a wireless communication method and a computer-readable medium.

BACKGROUND

A third generation partnership project (3GPP) proposes satellite communication as a choice in scenarios such as aircraft, marine ships and backhaul in remote areas, and proposes to make full use of abilities of satellites.

SUMMARY

Different from terrestrial network communication, in NTN communication, a channel measurement result may be inaccurate or out of date due to a rapid movement of low earth orbit (LEO) satellite and an ultra large time delay of geosynchronous earth orbit (GEO) satellite. One possible solution is that an uplink parameter is calculated based on satellite mobility information and a position of a user equipment (UE). However, not all UEs have a global navigation satellite system (GNSS) function. Further, due to the complexity of the channel, the uplink parameters calculated only based on the position of the UE and the satellite mobility information may be inaccurate.

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

An electronic device for wireless communication is provided according to an embodiment. The electronic device includes processing circuitry. The processing circuitry is configured to determine, according to an ability of a UE and/or a channel condition between the UE and a base station for non-terrestrial networks communication, an uplink transmission mode for the UE from among two or more uplink transmission modes which respectively correspond to different ways of the user equipment obtaining uplink transmission parameters. The processing circuitry is further configured to perform control to perform, based on the determined uplink transmission mode, uplink transmission from the user equipment to the base station.

According to another embodiment, a wireless communication method includes determining, according to an ability of a UE and/or a channel condition between the UE and a base station for non-terrestrial networks communication, an uplink transmission mode for the UE from among two or more uplink transmission modes which respectively correspond to different ways of the user equipment obtaining uplink transmission parameters; and performing, based on the determined uplink transmission mode, uplink transmission from the UE to the base station.

A computer readable medium is further provided according to an embodiment of the present disclosure. The computer readable medium includes executable instructions that, when executed by an information processing apparatus, cause the information processing apparatus to perform the method of the abovementioned embodiment.

According to the embodiments of the present disclosure, the UE can use a more suitable uplink transmission mode, thereby improving the system efficiency.

BRIEF DESCRIPTION OF THE DRAWINGS

The present disclosure can be understood better with reference to the description given in conjunction with the drawings in the following. The same or similar element is indicated by the same or similar reference numeral throughout all the drawings. The drawings are included in the description together with the following detailed illustration and form a part of the description, and are used to further illustrate preferred embodiments of the present disclosure and explain principles and advantages of the present disclosure by examples. In the drawings.

DETAILED DESCRIPTION OF EMBODIMENTS

Figure 1:
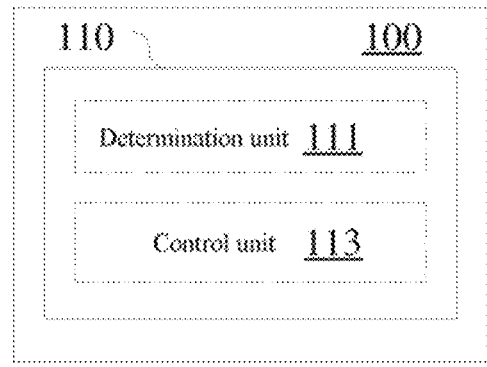
FIG. 1 is a block diagram showing a configuration example of an electronic device for wireless communication according to an embodiment of the present disclosure.

Embodiments of the present disclosure are described below with reference to the drawings. Elements and features described in one drawing or one embodiment of the present disclosure may be combined with elements and features illustrated in one or more other drawings or embodiments. It should be noted that, for clarity, indication and description of components and processing irrelevant to the present disclosure and known by those skilled in the art are omitted in the drawings and the illustration.

As shown in FIG. 1, an electronic device 100 for wireless communication according to an embodiment includes processing circuitry 110. The processing circuitry 110 may be implemented as a specific chip, a chipset, a central processing unit (CPU) or the like.

The processing circuitry 110 includes a determination unit 111 and a control unit 113. It should be noted that although the determination unit 111 and the control unit 113 are shown in a form of functional blocks in the drawings, it should be understood that functions of units may be implemented by the processing circuitry as a whole, and may be not necessarily implemented by discrete actual components in the processing circuitry. In addition, although the processing circuitry is shown in a block in the figure, the electronic device may include multiple processing circuitries, and the function of each unit may be distributed to the multiple processing circuitries, so that the multiple processing circuitries perform these functions in cooperation.

As described below with reference to specific embodiments, the electronic device 100 may be implemented at a base station side or a UE side.

The determination unit 111 is configured to determine, according to an ability of a UE and/or a channel condition between the UE and a base station for NTN communication, an uplink transmission mode for the UE from among two or more uplink transmission modes. The two or more uplink transmission modes respectively correspond to different ways of the UE obtaining uplink transmission parameters.

According to an embodiment, the uplink transmission mode may include a first mode, a second mode and a third mode as described below.

In the first mode, the UE predefines an uplink parameter set corresponding to different satellite orbit information, or obtains an uplink parameter set by an uplink parameter calculation formula predefined corresponding to different satellite orbit information, and performs the uplink transmission using the uplink parameter set. In the present disclosure, the first mode may also be described as an open-loop mode.

In the second mode, the UE obtains uplink transmission parameters according to an instruction from the base station, and performs the uplink transmission using the obtained uplink transmission parameters. In the present disclosure, the second mode may also be described as a close-loop mode.

In the third mode, the UE calculates the uplink transmission parameters according to positioning information of the UE and satellite orbit information, and performs the uplink transmission using the calculated uplink transmission parameters. In the present disclosure, the third mode may also be described as a semi-open-loop mode.

The satellite orbit information may include, for example, a mobility type of a satellite. The mobility type may be determined according to at least a part of ephemeris information of the satellite. According to an embodiment, the "at least a part of ephemeris information" may include altitude information and inclination angle information of the satellite.

In addition, a corresponding relationship between the mobility type of the satellite and the satellite orbit information may be known by both the base station and the UE. For example, the mobility type of the satellite may be broadcasted by the base station and received by the UE for obtaining the satellite orbit information.

Figure 5:
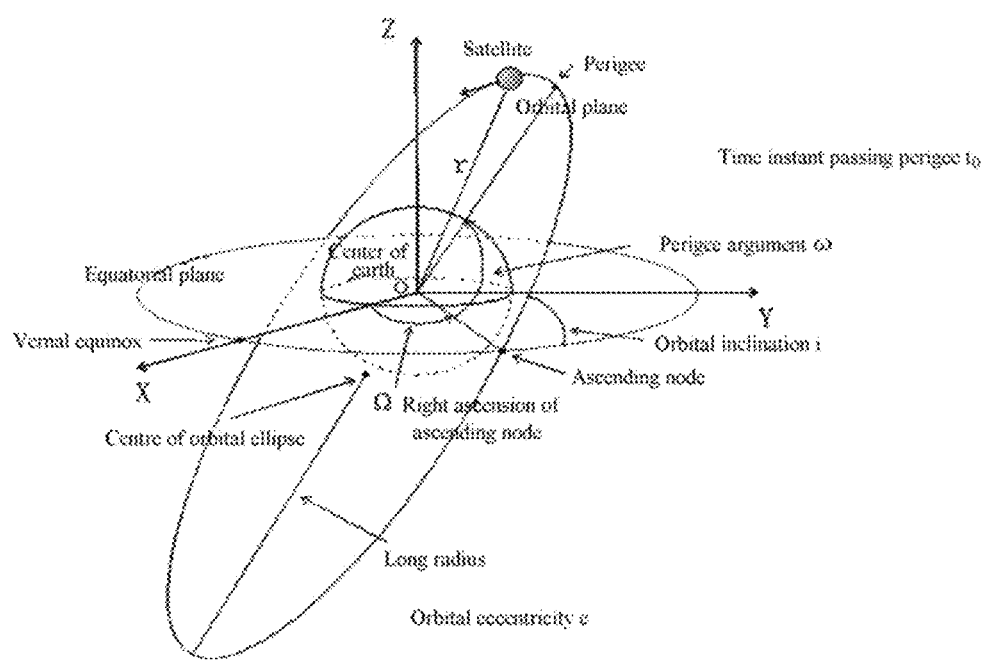
FIG. 5 is a schematic diagram showing satellite orbit elements.

As shown in FIG. 5, the satellite orbit information/ephemeris generally includes a major axis, a minor axis, an intersection angle Q, a perigee argument co, an orbital inclination i, a time instant passing perigee tp and other information. A position and a speed of the satellite at any time instant may be determined by these parameters. Orbit information of a satellite base station is generally transmitted to the UE by broadcasting. It is difficult to include all these information in broadcast information due to information overload, and also due to information of some satellites being confidential. By defining the mobility type, data amount of broadcasting the satellite orbit information can be reduced, accuracy of obtaining satellite mobility information by the UE can be improved, and satellite confidentiality or flexibility of adapting to different policies can be improved.

As an example, the mobility type may be defined in a manner as follows.

Mobility type 1: a satellite altitude of 800 km, an inclination angle of 0°, and a time instant passing perigee of tp1.

Mobility type 2: a satellite altitude ranging from 600 km to 700 km, and an inclination angle ranging from 0° to 5°.

Mobility type 3: ephemeris information such as DateTTR.A.(2000)Decl.DeltarElong.Phaseml
m2200910260941.54+1309.21.7881.71169.332 0.916.6
200910310952.04+1254.91.7671.73671.832.916.6.

Mobility type 4: a satellite altitude of 35786 km.

As shown in FIG. 1, the control unit 113 is configured to perform control to perform, based on the determined uplink transmission mode, uplink transmission from the UE to the base station.

According to an embodiment, in the first mode (that is, the open-loop mode), the UE may cyclically transmit uplink signals at a predetermined time interval using one or more predefined uplink parameter sets or one or more uplink parameter sets calculated by a predefined calculation formula.

For example, for a UE assigned to be in an open-loop mode, the UE may use predefined uplink parameter sets corresponding to different satellite base station orbit information, or the UE may use uplink parameter calculation formulas predefined corresponding to different satellite base station orbit information to calculate an uplink parameter set. Moreover, the UE may transmit uplink signals with certain criteria using predefined uplink parameters or uplink parameters calculated according to the predefined calculation formula. In addition, by using this way of transmitting the uplink signals, a UE without a GNSS function may transmit preamble during initial access.

Next, an example process of uplink transmission in an open-loop mode is described with reference to FIG. 6.

The base station notifies the mobility type of the satellite to the UE, for example, through a system information block (SIB).

For example, by using a lookup table, the UE may determine a predefined uplink parameter set according to the mobility type of the satellite (or calculate one uplink parameter set according to the predefined calculation formula), and cyclically transmit uplink signals at a time interval by using the uplink parameter set.

Figure 6:
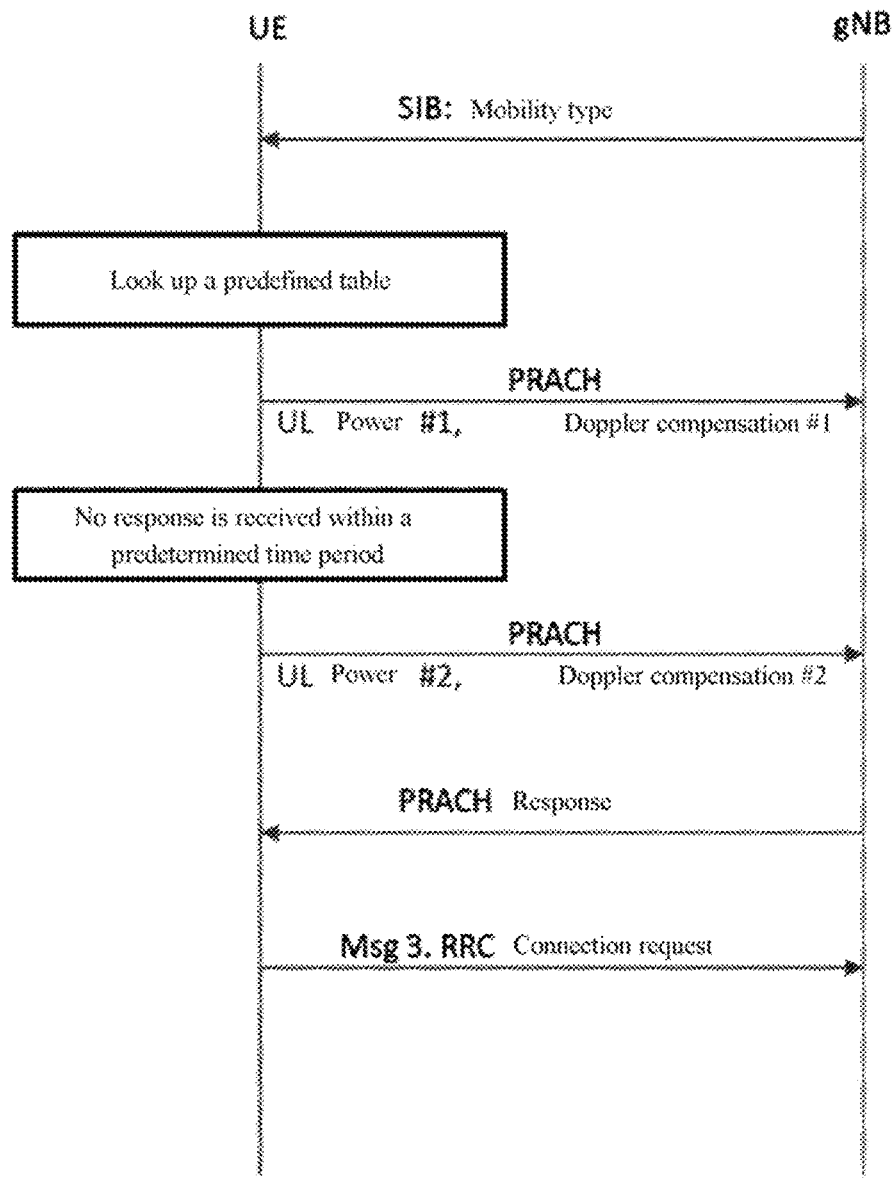
FIG. 6 shows an example process of uplink transmission in an open-loop mode as an example of an uplink transmission mode.

As shown in the example of FIG. 6, the UE may first transmit a physical random access channel (PRACH) using a first uplink power and a first Doppler compensation. In a case that no response is received from the base station within a predetermined time period, the UE may transmit the PRACH using a second uplink power and a second Doppler compensation. In addition, the UE transmits a radio resource control (RRC) connection request after receiving a PRACH response.

In addition, a second uplink parameter set may be, for example, obtained by adding an offset to each parameter in a first uplink parameter set. For example, the first uplink parameter set includes [Doppler compensation 1, Uplink power 1], and the second uplink parameter set includes [Doppler compensation 1+Offset D, Uplink power 1+Offset P].

It should be noted that above example is only illustrative and is not limiting.

Next, an example of uplink transmission in the second mode (that is, the close-loop mode) is described. In the close-loop mode, the UE obtains uplink transmission parameters according to an instruction from the base station. According to an embodiment, the instruction from the base station may include at least one of transmission power control (TPC) information for instructing an uplink transmission power and timing advance (TA) information for instructing advance of uplink transmission timing.

The timing advance is generally used for uplink transmission of a UE, which refers to, in order to make an uplink packet from the UE arrive at the base station at an expected time instant, estimating a radio frequency transmission delay caused by a distance and transmitting a data packet in advance by a corresponding time period. The base station may notify the magnitude of the timing advance to the UE by transmitting a timing advance command (TAC) to the UE.

In a long term evolution (LTE) system, the base station may determine TA of each UE by measuring uplink transmission of the UE. Therefore, as long as the UE has uplink transmission, the base station may estimate a TA value by using the uplink transmission. Theoretically, any signal (including but not limited to a sounding reference signal (SRS), a demodulation reference signal (DMRS), a channel quality instruction (CQI), acknowledgement/negative acknowledgement (ACK/NACK), a physical uplink shared channel (PUSCH), and the like) transmitted by a UE may be used to measure TA. In a random access process, the base station may determine timing advance by measuring received preamble.

In NTN, due to high-speed movement of the satellite base station, a distance between the UE and the base station may constantly change. Therefore, a transmission delay between the UE and the base station may also constantly change. In such case, TA is required to change accordingly.

Similarly, the TPC information for instructing an uplink transmission power may be required to be adjusted accordingly.

It should be noted that the uplink parameters obtained according to an instruction from the base station in the close-loop mode are not limited to the examples described above.

Next, an example of uplink transmission in the third mode (that is, the semi-open-loop) is described. In the semi-open-loop mode, the UE calculates uplink transmission parameters according to positioning information of the UE and satellite orbit information. According to an embodiment, the positioning information may include a position and a speed of the UE. The uplink transmission parameters may include an uplink transmission power, an uplink Doppler shift compensation, and/or uplink timing advance.

Figure 7:
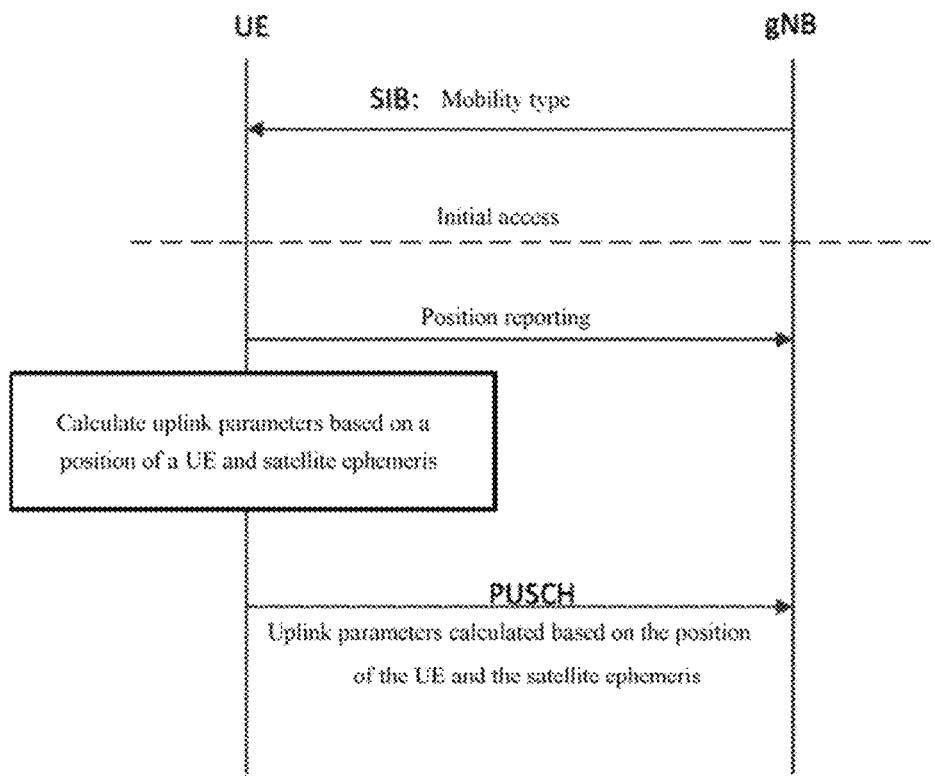
FIG. 7 shows an example process of uplink transmission in a semi-open-loop mode as an example of an uplink transmission mode.

FIG. 7 shows an example process of uplink transmission in a semi-open-loop mode.

First, the base station notifies the mobility type of the satellite to the UE, for example, through the SIB. Next, the UE may perform initial access and position reporting. In addition, the UE may calculate uplink transmission parameters according to the positioning information of the UE and the satellite orbit information, and perform uplink transmission based on the calculated uplink parameters.

An example for calculating uplink transmission parameters is described below by taking the uplink transmission power as an example.

In a case that the UE calculates the uplink transmission power, influence caused by movement of the base station may be introduced. Specifically, the uplink transmission power may be calculated by the following equation:

$$P_{PUSCH,b,f,c}(i, j, q_d, l) = \min\{P_{CMAX,F,C}(i), P_{O_{PUSCH},b,f,c}(j, \text{orbit}) + 10\log10(2^\mu \cdot M_{RB,b,f,c}^{PUSCH}(i)) + a_{b,f,c}(j) \cdot PL_{b,f,c}(q_d) + \Delta_{TF,b,f,c}(i) + f_{b,f,c}(i, l, \text{orbit})\}$$

where, $P_{CMAX,F,C}(i)$ represents a maximum transmission power of the UE; and $P_{O_{PUSCH},b,f,c}(j, \text{orbit})$ represents a sum of $P_{O\_NOMINAL\_PUSCH,\ f,c}(j)$ and $P_{O\_UE\_PUSCH,\ b,\ f,c}(j)$. If P0-PUSCH-AlphaSet is not configured by RRC for the UE, $P_{O\_UE\_PUSCH,\ b,\ f,c}(j)$ is equal to zero. $P_{O\_NOMINAL\_PUSCH,\ f,c}(0) = P_{O\_PRE} + \Delta_{PREAMBLE\_Msg3}$, where parameters of preambleReceivedTargetPower (a preamble received target power, for $P_{O\_PRE}$) andmsg3-DeltaPreamble (for $\Delta_{PREAMBLE\_Msg3}$) are configured by high-level signaling for a specific frequency band f and a serving cell C. $M_{RB,b,f,c}^{PUSCH}(i)$ represents a bandwidth allocated by PUSCH resources, which is represented by the number of resource blocks for a PUSCH transmission occasion i on an effective uplink bandwidth block b of a carrier f of the serving cell C. μ represents subcarrier spacing configuration. $a_{b,f,c}(j)$ is provided by a high-level parameter a. $PL_{b,f,c}(q_d)$ represents estimated downlink path loss of the serving cell C, in dB, which is calculated by US using a reference signal (RS) index $q_d$ for an effective downlink bandwidth block. ΔTF,b,f,c(i) represents a power offset determined by a modulation coding mode (MCS). The MCS of the UE is scheduled by the base station. A transmission power spectral density of the UE may be adjusted quickly by setting transmission MCS of the UE, to achieve an effect like fast power control. $f_{b,f,c}(i,l,\text{orbit})$ represents an adjustment value according to the power control command TPC in downlink control information (DCI) of a physical downlink control channel (PDCCH).

In the above example, parameters of the mobility type of the satellite base station are described. As described above, different mobility types correspond to different ephemeris information or some ephemeris feature information of the satellite, such as altitude information and inclination angle information. The corresponding (correspondence) information is known by both the base station and the UE. For example, the satellite base station may broadcast its own mobility type to the user.

It should be noted that the way for calculating the uplink parameters in the semi-open-loop mode is not limited to the above example.

As shown in FIG. 1, according to an embodiment, the determination unit 111 determines, according to an ability of a UE, an uplink transmission mode for the UE, which may include taking, for a UE with a GNSS function, the third mode (that is, the semi-open-loop) as a default mode; and taking, for a UE without the GNSS function, the first mode (that is, the open-loop) as a default mode.

In order to save cost, some UEs (such as some terminals of Internet of things) may have no positioning function. In a case that a UE does not know its own position, the UE cannot precisely calculate a Doppler shift compensation and an uplink power through mobility state information broadcasted by the base station. In such case, for example, an uplink signal may be cyclically transmitted to obtain an uplink transmission gain. For a UE with the positioning function, a channel measurement result may be inaccurate due to a large time delay caused by a long distance between the satellite and the UE and the mobility of the satellite. Therefore, a semi-open-loop calculation way based on the mobility of the satellite base station and a position of the UE may be used.

Figure 9:
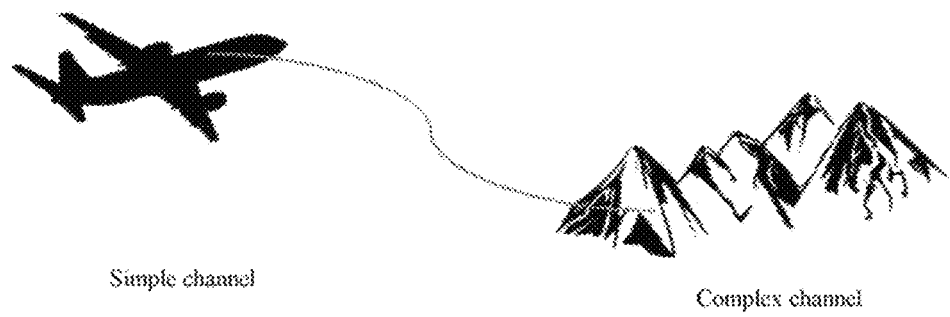
FIG. 9 shows an example case of a change of an NTN communication scenario.

In addition, even for the UE with the GNSS function, due to complexity of a transmission channel (for example, as shown in FIG. 9, in a case that a transport travels on a complex terrain), the uplink parameter determined only based on the mobility of the satellite and the position of the UE may not meet communication requirements. In such case, the uplink parameter is required to be adjusted by the base station according to measurement of the uplink signal.

According to an embodiment, the determination of an uplink transmission mode by the determination unit 111 may include changing, in a case where communication quality of the uplink transmission performed through the first mode (that is, the open-loop mode) or the third mode (that is, the semi-open-loop mode) is lower than a predetermined level, the uplink transmission mode to the second mode (that is, the close-loop mode).

An index of the communication quality may include, for example, a reference signal reception power (RSRP), a signal to interference noise ratio (SINR), reference signal reception quality (RSRQ), a received signal strength instruction (RSSI) and the like. RSRP refers to an average of signal powers received on all resource elements (REs) carrying the reference signal in a symbol. RSRP is a critical parameter representing a wireless signal strength and one of measurement requirements on a physical layer. SINR refers to a ratio of a strength of a received useful signal to a strength of a received interference signal (noise and interference). RSRQ refers to reception quality of the reference signal. This metric is mainly used to sort different candidate cells according to the signal quality. This measurement is used as an input for handover and reselecting a cell. RSRQ is defined as a ratio of N*RSRQ to RSSI of a carrier, where N represents the number of resource blocks (RB) of a measurement bandwidth of RSSI of a LTE carrier. An effective way to report the combination of signal strength and interference is achieved by RSRQ. RSSI is used to determine the link quality and whether to increase broadcast transmission strength.

In addition, determination of an uplink transmission mode by the determination unit 111 may include changing, in a case where a difference between uplink transmission parameters calculated through the third mode (that is, the semi-open-loop mode) and uplink transmission parameters obtained by measuring uplink signals of the UE is greater than a predetermined level, the uplink transmission mode to the second mode (that is, the close-loop mode).

Figure 8:
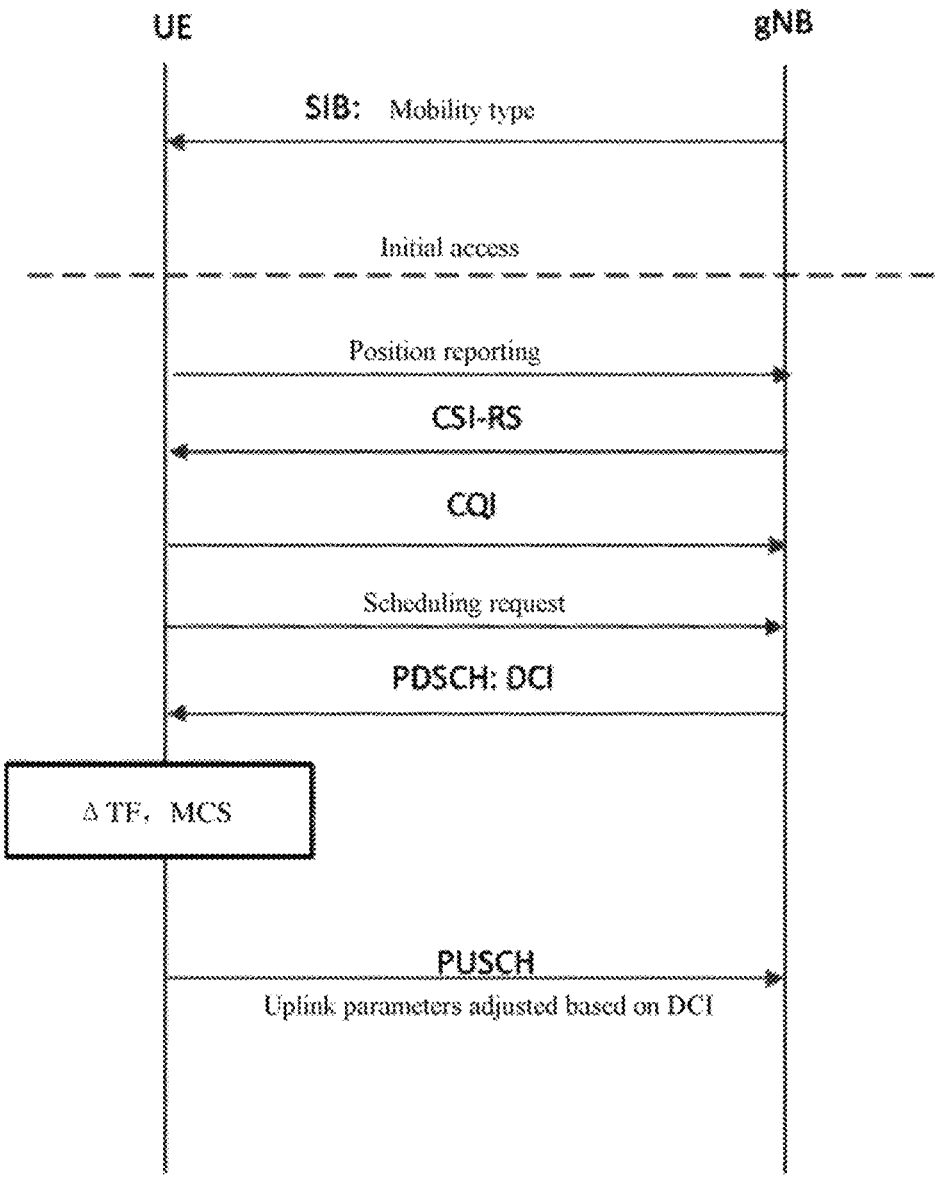
FIG. 8 shows an example process of uplink transmission in a close-loop mode as an example of an uplink transmission mode.

FIG. 8 shows an example process of uplink transmission in a close-loop mode.

First, the base station notifies the mobility type of the satellite to the UE, for example, through the SIB. Next, the UE may perform initial access and position reporting. The base station transmits a channel status instruction reference signal (CSI-RS) to the UE, and the UE transmits a CQI based on measurement of the CSI-RS. In addition, the UE transmits a scheduling request to the base station, and the base station transmits a DCI to the UE. The UE determines an uplink parameter, such as ΔTF and MCS based on DCI, and performs uplink transmission based on the uplink parameter.

The examples of uplink transmission modes are described above, including the open-loop mode, the close-loop mode and the semi-open-loop mode. Different modes correspond to different transmission of the uplink signal. The base station may determine which uplink transmission mode to be used by a UE according to at least one an ability of the UE and a current channel condition.

For example, after accessing to the system, the UE may report an ability (for example, whether the UE has the GNSS function) of the UE to the base station. The base station determines whether the uplink transmission mode of the UE is the open-loop mode or the semi open-loop mode, for example, according to whether the UE has the GNSS function.

Alternatively, after accessing to the system, the UE may report position information of the UE to the base station, and the base station calculates a first uplink parameter set based on the position of the UE and orbit information of the satellite base station. In addition, the base station may obtain a second uplink parameter set expected by the base station to be used by the UE by measuring the uplink signal, such as preamble and SRS. By comparing the first uplink parameter set and the second uplink parameter set, the base station may determine which uplink transmission mode is allocated to the UE, such as the close-loop mode or the semi-open-loop mode.

In addition, after accessing to the system, the UE may be configured to use the uplink transmission mode of the semi-open-loop. However, the uplink parameters calculated based on the UE side are no longer applicable due to change of the channel condition. The base station may update the uplink transmission mode of the UE as the close-loop mode, for example, by RRC reconfiguration or DCI.

Figure 10:
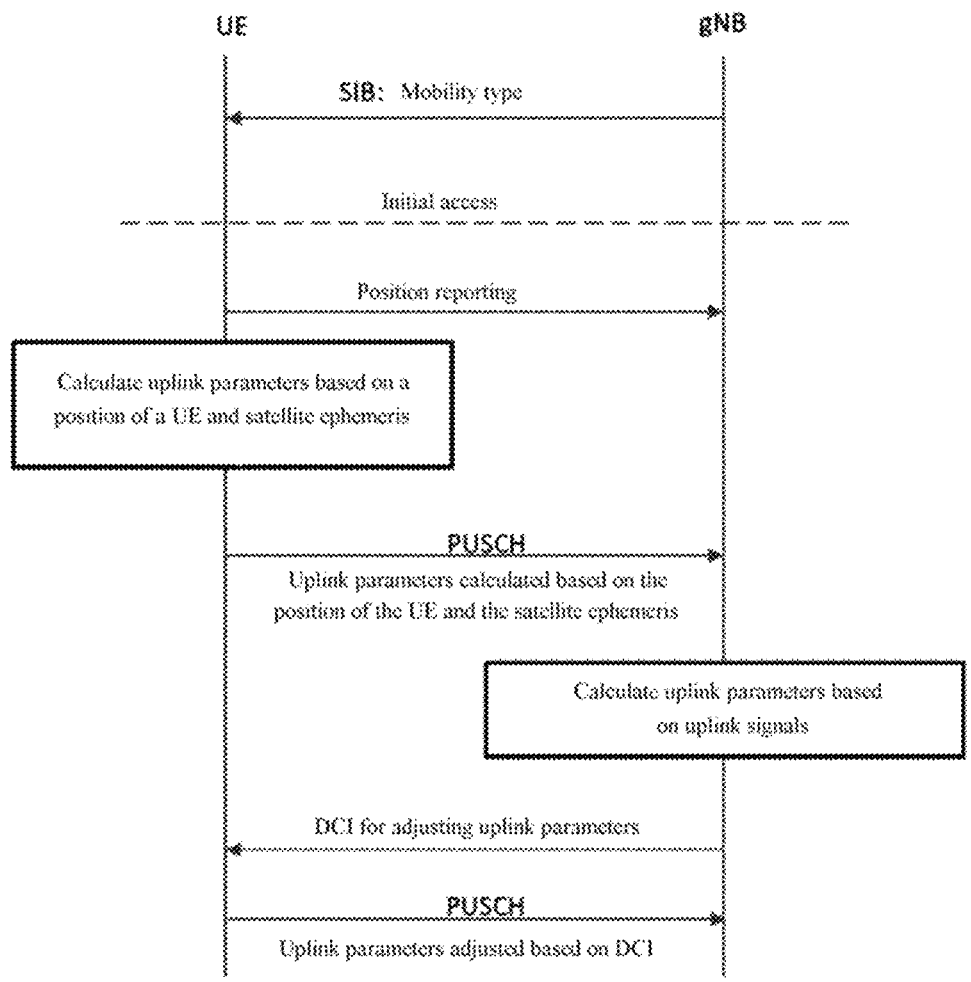
FIG. 10 shows an example process of a change of an uplink transmission mode.

FIG. 10 shows an example process of change of an uplink transmission mode.

First, the base station notifies the mobility type of the satellite to the user, for example, through the SIB. Next, the UE can perform initial access and position reporting. In addition, the UE in the semi-open-loop mode calculates uplink transmission parameters according to the positioning information of the UE and the satellite orbit information, and performs uplink transmission based on the calculated uplink parameters. The base station calculates the uplink parameters based on the uplink signal, determines that the UE should perform uplink transmission in the close-loop mode, and notifies an instruction for adjusting uplink parameters to the UE. Next, the UE performs uplink transmission by using the adjusted uplink parameters.

As described above, the electronic device 100 may be implemented on the base station side. In this case, the control unit 113 may further be configured to perform control to notify the uplink transmission mode determined by the determination unit 111 to the UE.

More particularly, the control unit 113 may be configured, for example, to notify configuration and/or replacement of the uplink transmission mode by one or more of the following ways: configuring or re-configuring by RRC signaling; semi-statically configuring by a media access control control element (MAC CE); and dynamically configuring through DCI.

The configuration and/or replacement of the uplink transmission mode may be notified in an explicit manner. For example, according to an embodiment, an uplink transmission mode to be adopted may be indicated by information in the RRC signaling, the MAC CE or the DCI. For example, according to an embodiment, the uplink transmission mode adopted by the UE may be indicated by an RRC parameter txMode. According to another embodiment, a new DCI format may be added, such as a DCI format 0_0_a, which does not include parameter instruction of uplink transmission.

Alternatively, the configuration and/or replacement of the uplink transmission mode may be notified in an implicit manner. For example, according to an embodiment, the configuration and/or replacement of the uplink transmission mode may be notified by the following way: representing that the UE uses the third mode, when a value indicating uplink transmission parameters in configuration information with respect to uplink transmission is null; and representing that the UE uses the second mode, when the value indicating uplink transmission parameters in the configuration information is not null.

The configuration information for uplink transmission may include, for example, information in the RRC signaling, the MAC CE or the DCI. For example, when a value indicating uplink transmission parameters in the DCI for scheduling uplink data is null, it indicates that the base station instructs the UE to use the semi-open-loop mode. When a value indicating uplink transmission parameters in the DCI for scheduling uplink data is not null, it indicates that the base station instructs the UE to use the close-loop mode. For another example, a TAC instruction is a MAC CE instruction. In a case that TAC MAC CE is default, it indicates that the semi-open-loop mode is adopted, and in a case that TAC MAC CE is not null, it indicates that the close-loop mode is adopted.

The instruction mode of the uplink transmission mode is further described by taking the DCI format 0_0 as an example. For example, in a case that contents of the fields Modulation and coding scheme and TPC command for scheduled PUSCH in the DCI format 0_0 are null, it indicates that the base station instructs the UE to use the semi-open-loop mode. In a case that the contents of the fields Modulation and coding scheme and TPC command for scheduled PUSCH are not null, it indicates that the base station instructs the UE to use the close-loop mode.

As described above, the electronic device 100 may also be implemented on the UE side. In this case, the UE may determine the uplink transmission mode according to an ability (for example, whether the UE has the GNSS function) of the UE. For example, in a case that the UE has the GNSS function, the third mode (that is, the semi-open-loop mode) is the default mode. In a case that the UE has no the GNSS function, the first mode (that is, the open-loop mode) is the default mode.

In addition, the control unit 113 may further be configured to perform control to notify information related to the ability of the UE to the base station, so that the base station side can determine the uplink transmission mode.

In the above description of the electronic device according to the embodiments of the present disclosure, it is apparent that the following process and method are further disclosed. Next, a wireless communication method according to embodiments of the present disclosure is described without repeating details described above.

Figure 2:
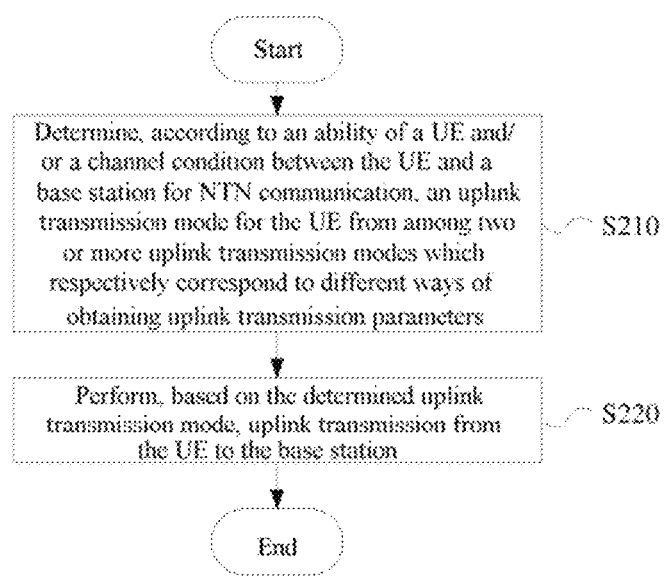
FIG. 2 is a flow chart showing a process example of a wireless communication method according to an embodiment of the present disclosure.

As show in FIG. 2, a wireless communication method according to an embodiment includes a step S210. In step S210, an uplink transmission mode for the UE is determined from among two or more uplink transmission modes according to an ability of a UE and/or a channel condition between the UE and a base station for NTN communication, the two or more uplink transmission modes respectively corresponding to different ways of the UE obtaining uplink transmission parameters. The method further includes a step S220. In step S220, uplink transmission from the UE to the base station is performed based on the determined uplink transmission mode.

As described above, different uplink transmission modes may include, for example, an open-loop mode, a close-loop mode or semi-open-loop mode. For a UE with a GNSS function, the semi-open-loop mode may be used as a default mode. For a UE without the GNSS function, the open-loop mode may be used as the default mode.

The above method may be implemented on the base station side or the UE side.

Figure 3:
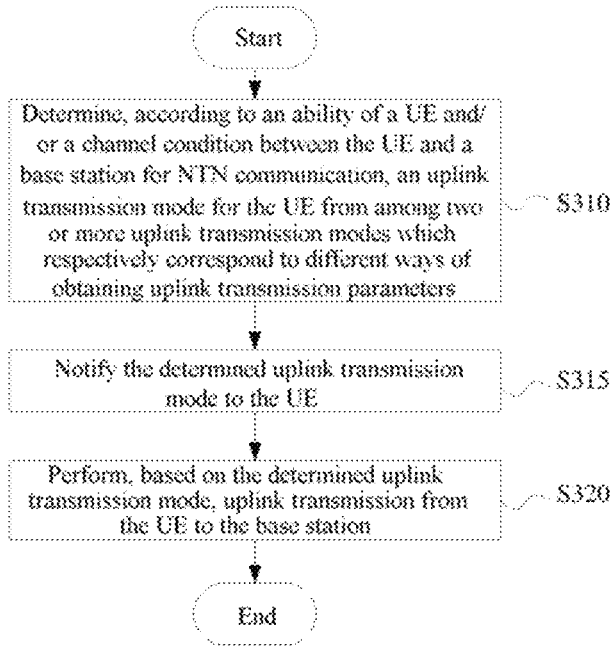
FIG. 3 is a flow chart showing a process example of a wireless communication method according to another embodiment.

In a case of being implemented on the base station side, as shown in FIG. 3, the wireless communication method according to an embodiment may include step S315 in addition to steps S310 and S320 respectively corresponding to steps S210 and S220. In step S315, the determined uplink transmission mode is notified to the UE.

Figure 4:
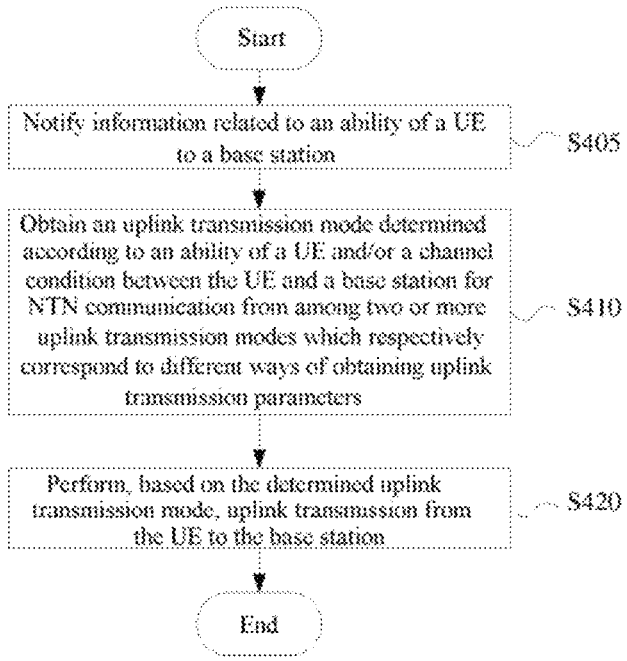
FIG. 4 is a flow chart showing a process example of a wireless communication method according to yet another embodiment.

In a case of being implemented on the UE side, as shown in FIG. 4, the wireless communication method according to an embodiment may include step S405 in addition to steps S410 and S420 respectively corresponding to steps S210 and S220. In step S405, the information related to the ability of the UE is notified to the base station.

In addition, a computer readable medium is provided according to an embodiment of the present disclosure. The computer readable medium includes executable instructions that, when executed by an information processing apparatus, cause the information processing apparatus to perform the method according to the embodiment described above.

For example, steps of the above method and modules and/or units of the above device may be implemented as software, firmware, hardware, or a combination thereof. In a case of implementing by software or firmware, programs constituting the software for implementing the method above are installed to a computer (for example, a general-purpose computer 1100 shown in FIG. 11) with a dedicated hardware structure from the storage medium or the network. The computer can perform various functions when installed with various programs.

Figure 11:
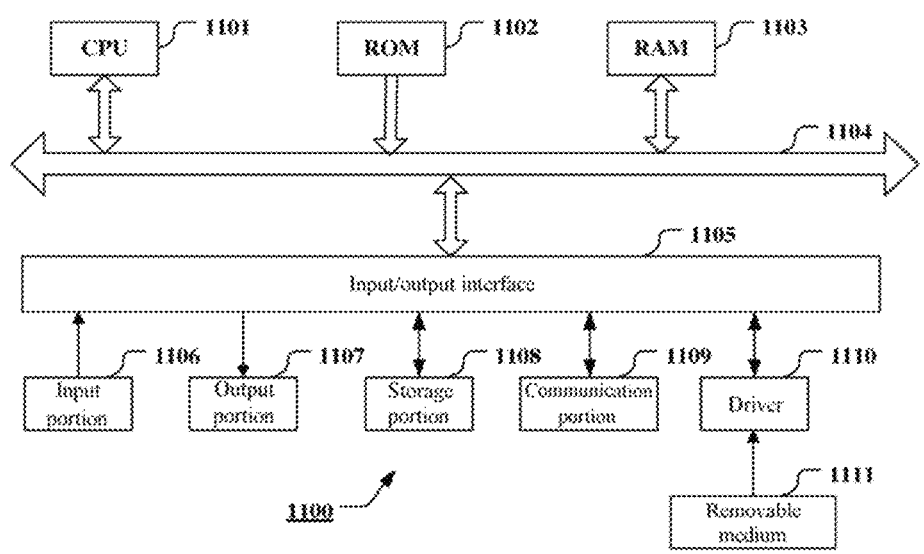
FIG. 11 is a block diagram showing an exemplary structure of a computer for implementing the method and the device according to the present disclosure.

In FIG. 11, a central processing unit (CPU) 1101 performs various processing according to a program stored in a read only memory (ROM) 1102 or a program loaded from a storage portion 1108 to a random access memory (RAM) 1103. In the RAM 1103, data required for the CPU 1101 to perform various processes or the like is also stored as necessary. The CPU 1101, the ROM 1102, and the RAM 1103 are linked to each other via a bus 1104. An input/output interface 1105 is also linked to the bus 1104.

The following components are linked to the input/output interface 1105: an input portion 1106 (including a keyboard, and a mouse and so on), an output portion 1107 (including a display, such as a cathode ray tube (CRT) and a liquid crystal display (LCD), and a speaker), a storage portion 1108 (including a hard disk and so on), and a communication portion 1109 (including a network interface card, such as a LAN card, and a modem). The communication portion 1109 performs communication processing via a network such as the Internet. A driver 1110 may also be linked to the input/output interface 1105 as needed. A removable medium 1111 such as a magnetic disk, an optical disk, a magnetic-optical disk and a semiconductor memory may be installed on the driver 1110 as needed, such that computer programs read from the removable medium 1111 are installed into the storage portion 1108 as needed.

In a case that the series of processing described above is implemented by software, a program constituting the software is installed from a network such as the Internet or a storage medium such as the removable medium 1111.

Those skilled in the art should understand that the storage medium is not limited to the removable medium 1111 shown in FIG. 11 in which a program is stored and which is distributed separately from the apparatus to provide the program to the user. An example of the removable medium 1111 includes: a magnetic disk (including a floppy disk (registered trademark)), an optical disk (including a compact disk read only memory (CD-ROM) and a digital versatile disk (DVD)), a magneto-optical disk (including a mini-disk (MD) (registered trademark)) and a semiconductor memory. Alternatively, the storage medium may be the ROM 1102, a hard disk included in the storage portion 1108 or the like. The program is stored in the storage medium, and the storage medium is distributed to the user together with the device including the storage medium.

A program product storing machine-readable instruction codes is further provided according to an embodiment of the present disclosure. The instruction codes, when read and executed by a machine, perform the method according to the embodiment of the present disclosure described above.

Accordingly, a storage medium for carrying the above program product storing the machine-readable instruction codes is further included in the present disclosure. The storage medium includes but is not limited to, a floppy disk, an optical disk, a magneto-optical disk, a storage card, a memory stick and the like.

The embodiments of the present disclosure further relate to the following electronic devices. In a case that the electronic device is used for a base station side, the electronic device may be implemented as any type of gNB or evolution Node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base station, such as a NodeB and a base transceiver station (BTS). The electronic device may include: a main body (also referred to as a base station device) configured to control wireless communication; and one or more remote radio heads (RRH) arranged at positions different from the main body. In addition, various types of terminals described below may operate as a base station by performing functions of the base station temporarily or in a semi-persistent manner.

In a case that the electronic device is used for a user equipment side, the electronic device may be implemented as a mobile terminal (such as a smart phone, a tablet personal computer (PC), a notebook PC, a portable game terminal, a portable/dongle mobile router and a digital camera) or a vehicle terminal (such as a car navigation apparatus). In addition, the electronic device may be a wireless communication module (such as an integrated circuit module including one or more chips) installed on each of the above terminals.

[Application Example on Terminal Equipment]

Figure 12:
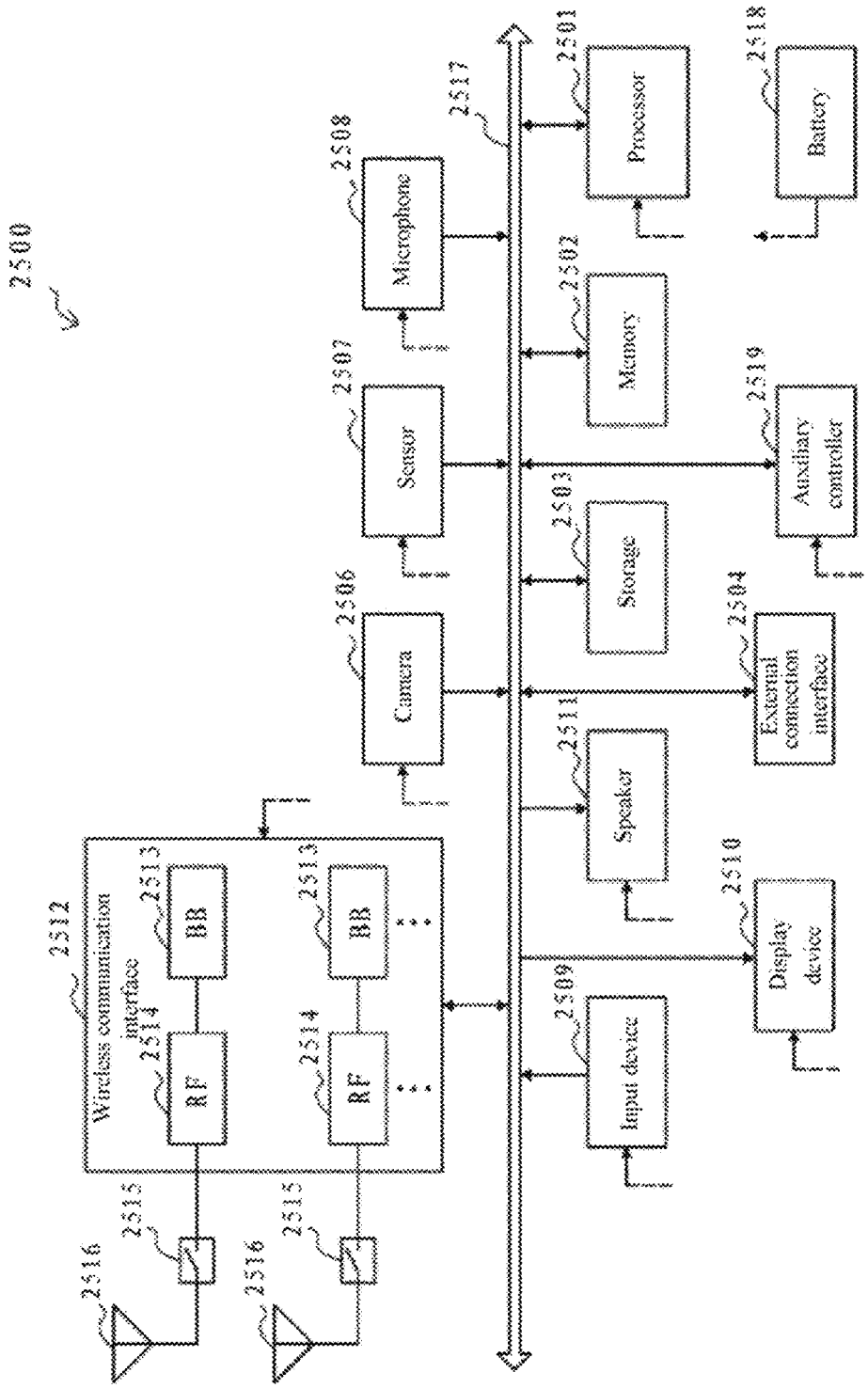
FIG. 12 is a block diagram showing a schematic configuration example of a smart phone to which the technology of the present disclosure may be applied.

FIG. 12 is a block diagram showing a schematic configuration example of a smart phone 2500 to which the technology of the present disclosure may be applied. The smart phone 2500 includes a processor 2501, a memory 2502, a storage 2503, an external connection interface 2504, a camera 2506, a sensor 2507, a microphone 2508, an input device 2509, a display device 2510, a speaker 2511, a wireless communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program executed by the processor 2501 and data. The storage 2503 may include a storage medium such as a semiconductor memory and a hard disk. The external connection interface 2504 is an interface for connecting an external apparatus (such as a memory card and a universal serial bus (USB) apparatus) to the smart phone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 to audio signals. The input device 2509 includes, for example, a touch sensor configured to detect touch onto a screen of the display device 2510, a keypad, a keyboard, a button, or a switch, and receive an operation or information inputted from a user. The display device 2510 includes a screen (such as a liquid crystal display (LCD) and an organic light-emitting diode (OLED) display), and displays an output image of the smart phone 2500. The speaker 2511 converts audio signals that are outputted from the smart phone 2500 to sounds.

The wireless communication interface 2512 supports any cellular communication scheme (such as LTE and LTE-Advanced), and performs wireless communication. The wireless communication interface 2512 may typically include, for example, a base band (BB) processor 2513 and a radio frequency (RF) circuit 2514. The BB processor 2513 may perform, for example, encoding/decoding, modulating/demodulating, and multiplexing/demultiplexing, and performs various types of signal processing for wireless communication. In addition, the RF circuit 2514 may include, for example, a mixer, a filter, and an amplifier, and transmits and receives wireless signals via the antenna 2516. The wireless communication interface 2512 may be a chip module having the BB processor 2513 and the RF circuit 2514 integrated thereon. As shown in FIG. 12, the wireless communication interface 2512 may include multiple BB processors 2513 and multiple RF circuits 2514. Although FIG. 12 shows the example in which the wireless communication interface 2512 includes the multiple BB processors 2513 and the multiple RF circuits 2514, the wireless communication interface 2512 may also include a single BB processor 2513 or a single RF circuit 2514.

Furthermore, in addition to a cellular communication scheme, the wireless communication interface 2512 may support another type of wireless communication scheme such as a short-distance wireless communication scheme, a near field communication scheme, and a wireless local area network (LAN) scheme. In this case, the wireless communication interface 2512 may include the BB processor 2513 and the RF circuit 2514 for each wireless communication scheme.

Each of the antenna switches 2515 switches connection destinations of the antennas 2516 among multiple circuits (such as circuits for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive wireless signals. As shown in FIG. 12, the smart phone 2500 may include the multiple antennas 2516. Although FIG. 12 shows the example in which the smart phone 2500 includes the multiple antennas 2516, the smart phone 2500 may also include a single antenna 2516.

Furthermore, the smart phone 2500 may include the antenna 2516 for each wireless communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input device 2509, the display device 2510, the speaker 2511, the wireless communication interface 2512, and the auxiliary controller 2519 to each other. The battery 2518 supplies power to blocks of the smart phone 2500 shown in FIG. 12 via feeder lines that are partially shown as dashed lines in the FIG. 12. The auxiliary controller 2519 operates a minimum necessary function of the smart phone 2500, for example, in a sleep mode.

In the smart phone 2500 shown in FIG. 12, a transceiving apparatus or a transceiving unit in the apparatus for a user equipment side according to the embodiment of the present disclosure may be implemented by the wireless communication interface 2512. At least part of functions of the processing circuit and/or the units in the electronic device or the information processing apparatus for the user equipment side according to the embodiment of the present disclosure may also be implemented by the processor 2501 or the auxiliary controller 2519. For example, the power consumption of the battery 2518 may be reduced by the auxiliary controller 2519 performing part of the functions of the processor 2501. In addition, the processor 2501 or the auxiliary controller 2519 may execute at least part of the functions of the processing circuit and/or the units in the electronic device or the information processing apparatus for the user equipment side according to the embodiment of the present disclosure by executing the programs stored in the memory 2502 or the storage 2503.

[Application Example on Base Station]

Figure 13:
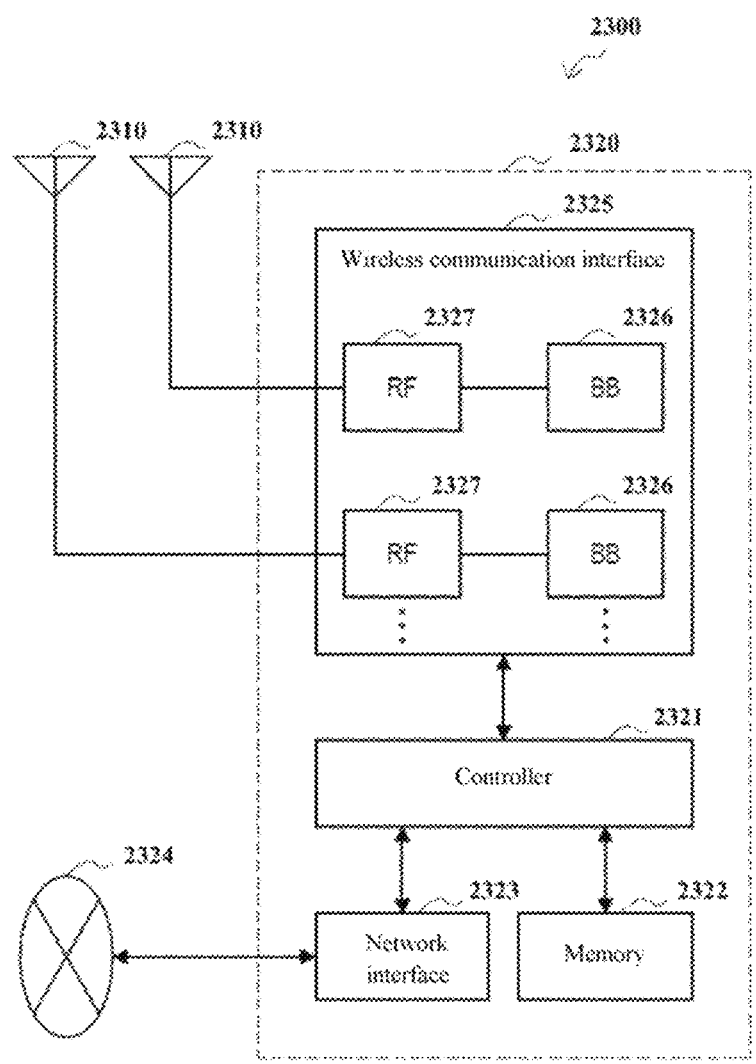
FIG. 13 is a block diagram showing a schematic configuration example of a base station (gNB) to which the technology of the present disclosure may be applied.

FIG. 13 is a block diagram showing a schematic configuration example of a gNB to which the technology of the present disclosure may be applied. A gNB 2300 includes multiple antennas 2310 and a base station device 2320. The base station device 2320 and each of the antennas 2310 may be connected to each other via a radio frequency (RF) cable.

Each of the antennas 2310 includes a single or multiple antenna elements (such as multiple antenna elements included in a multi-input multi-output (MIMO) antenna), and is used for the base station device 2320 to transmit and receive wireless signals. As shown in FIG. 13, the gNB 2300 may include the multiple antennas 2310. For example, the multiple antennas 2310 may be compatible with multiple frequency bands used by the gNB 2300.

The base station device 2320 includes a controller 2321, a memory 2322, a network interface 2323, and a wireless communication interface 2325.

The controller 2321 may be, for example, a CPU or a DSP, and operates various functions of a higher layer of the base station device 2320. For example, the controller 2321 generates a data packet from data in signals processed by the wireless communication interface 2325, and transfers the generated packet via the network interface 2323. The controller 2321 may bundle data from multiple base band processors to generate the bundled packet, and transfer the generated bundled packet. The controller 2321 may have logical functions of performing control such as radio resource control, radio bearer control, mobility management, admission control and scheduling. The control may be performed in corporation with a gNB or a core network node in the vicinity. The memory 2322 includes a RAM and a ROM, and stores a program executed by the controller 2321, and various types of control data (such as a terminal list, transmission power data, and scheduling data).

The network interface 2323 is a communication interface for connecting the base station device 2320 to a core network 2324. The controller 2321 may communicate with a core network node or another gNB via the network interface 2323. In this case, the gNB 2300, and the core network node or the other gNB may be connected to each other via a logical interface (such as an S1 interface and an X2 interface). The network interface 2323 may further be a wired communication interface or a wireless communication interface for wireless backhaul. If the network interface 2323 is a wireless communication interface, the network interface 2323 may use a higher frequency band for wireless communication than a frequency band used by the wireless communication interface 2325.

The wireless communication interface 2325 supports any cellular communication scheme (such as Long Term Evolution (LTE) and LTE-Advanced), and provides wireless connection to a terminal positioned in a cell of the gNB 2300 via the antenna 2310. The wireless communication interface 2325 may typically include, for example, a BB processor 2326 and an RF circuit 2327. The BB processor 2326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2326 may have a part or all of the above logical functions instead of the controller 2321. The BB processor 2326 may be a memory that stores a communication control program, or a module that includes a processor and a related circuit configured to execute the program. Updating the program may allow the functions of the BB processor 2326 to be changed. The module may be a card or a blade that is inserted into a slot of the base station device 2320. Alternatively, the module may further be a chip that is mounted on the card or the blade. In addition, the RF circuit 2327 may include, for example, a mixer, a filter, and an amplifier, and transmits and receives wireless signals via the antenna 2310.

As shown in FIG. 13, the wireless communication interface 2325 may include the multiple BB processors 2326. For example, the multiple BB processors 2326 may be compatible with multiple frequency bands used by the gNB 2300.

As shown in FIG. 13, the wireless communication interface 2325 may include the multiple RF circuits 2327. For example, the multiple RF circuits 2327 may be compatible with multiple antenna elements. Although FIG. 13 shows the example in which the wireless communication interface 2325 includes the multiple BB processors 2326 and the multiple RF circuits 2327, the wireless communication interface 2325 may also include a single BB processor 2326 or a single RF circuit 2327.

In the gNB 2300 shown in FIG. 13, the transceiving apparatus in the wireless communication device at the base station side may be implemented by the wireless communication interface 2325. At least a part of functions of the processing circuitry and/or units in the electronic device or the wireless communication device at the base station side may be implemented by the controller 2321. For example, the controller 2321 may perform at least a part of the functions of the processing circuitry and/or various units of the electronic device or the wireless communication device at the base station side by performing the programs stored in the memory 2322.

In the above description of the embodiments of the present disclosure, features described and/or illustrated for one embodiment may be used in one or more other embodiments in the same or similar manner, or may be combined with features in other embodiments, or may replace features in other embodiments.

It is be noted that, terms "including/comprising" used herein refer to existing of features, elements, steps or components, but existing or adding of one or more other features, elements, steps or components is not excluded.

In the above embodiments and examples, reference numerals consist of numerals are used to represent steps and/or units. Those skilled in the art should understand that the reference numerals are used only for facilitating description and illustration and are not intended to represent an order or limit in any other manner.

In addition, the method of the present disclosure is not limited to be performed in a chronological order described in the specification, but may also be performed in other chronological order, in parallel or independently. Therefore, the order for executing the method described in this specification does not limit the technical scope of the present disclosure.

Although the present disclosure has been described by specific embodiments according to the present disclosure, it should be understood that all of the embodiments and examples described above are illustrative and not restrictive. Various modifications, improvements or equivalents of the present disclosure may be designed by those skilled in the art from the spirit and the scope of the appended claims. Such modifications, improvements or equivalents shall be construed as being included within the scope of protection of the present disclosure.

In addition, the following solutions are further provided according to embodiments of present disclosure.

(1) An electronic device for wireless communication, including processing circuitry configured to:

determine, according to an ability of a user equipment and/or a channel condition between the user equipment and a base station for non-terrestrial networks communication, an uplink transmission mode for the user equipment from among two or more uplink transmission modes, where the two or more uplink transmission modes respectively correspond to different ways of the user equipment obtaining uplink transmission parameters; and perform control to perform, based on the determined uplink transmission mode, uplink transmission from the user equipment to the base station.

(2) The electronic device according to (1), where the two or more uplink transmission modes includes:

a first mode, in which the user equipment predefines an uplink parameter set corresponding to different satellite orbit information, or obtains an uplink parameter set by an uplink parameter calculation formula predefined corresponding to different satellite orbit information, and performs the uplink transmission using the uplink parameter set;

a second mode, in which the user equipment obtains uplink transmission parameters according to an instruction from the base station, and performs the uplink transmission using the obtained uplink transmission parameters; and a third mode, in which the user equipment calculates uplink transmission parameters according to its positioning information and satellite orbit information, and performs the uplink transmission using the calculated uplink transmission parameters.

(3) The electronic device according to (2), where in the first mode, the user equipment cyclically transmits uplink signals at a predetermined time interval using one or more predefined uplink parameter sets or one or more uplink parameter sets calculated by a predefined calculation formula.

(4) The electronic device according to (2), where the instruction includes transmission power control (TPC) information for instructing an uplink transmission power and/or timing advance (TA) information for instructing advance of uplink transmission timing.

(5) The electronic device according to claim (2), where the positioning information includes a position and a speed of the user equipment, and the uplink transmission parameters include one or more of the following parameters: an uplink transmission power, an uplink Doppler shift compensation, and uplink timing advance.

(6) The electronic device according to (2), where the satellite orbit information includes a mobility type of a satellite, the mobility type being determined according to at least a part of ephemeris information of the satellite.

(7) The electronic device according to (6), where the at least a part of ephemeris information includes altitude information and inclination angle information of the satellite.

(8) The electronic device according to (6), where a corresponding relationship between the mobility type of the satellite and the satellite orbit information are known by both the base station and the user equipment.

(9) The electronic device according to (6), where the mobility type of the satellite is broadcasted by the base station and received by the user equipment for obtaining the satellite orbit information.

(10) The electronic device according to (2), where determination of the uplink transmission mode includes:

taking, for a user equipment with a Global Navigation Satellite System (GNSS) function, the third mode as a default mode; and taking, for a user equipment without the GNSS function, the first mode as a default mode.

(11) The electronic device according to (2), operating as the base station, where the processing circuitry is further configured to perform control to notify the determined uplink transmission mode to the user equipment.

(12) The electronic device according to (11), where the processing circuitry is configured to notify configuration and/or replacement of the uplink transmission mode in one or more ways of:

configuring or re-configuring by radio resource control (RRC) signaling;

semi-statically configuring by a media access control control element (MAC CE); and dynamically configuring through downlink control information (DCI).

(13) The electronic device according to (12), where the processing circuitry is configured to indicate an uplink transmission mode to be adopted by information in the RRC signaling, the MAC CE or the DCI.

(14) The electronic device according to (11), where the processing circuitry is configured to notify configuration and/or replacement of the uplink transmission mode in one or more of the ways of:

representing that the user equipment uses the third mode, when a value indicating uplink transmission parameters in configuration information with respect to uplink transmission is null; and representing that the user equipment uses the second mode, when the value indicating uplink transmission parameters in the configuration information is not null.

(15) The electronic device according to (11), where determination of the uplink transmission mode includes:

changing, in a case where communication quality of the uplink transmission performed through the first mode or the third mode is lower than a predetermined level, the uplink transmission mode to the second mode; and changing, in a case where a difference between uplink transmission parameters calculated through the third mode and uplink transmission parameters obtained by measuring uplink signals of the user equipment is greater than a predetermined level, the uplink transmission mode to the second mode.

(16) The electronic device according to any one of (1) to (10), operating as the user equipment, where the processing circuitry is further configured to:

perform control to notify information related to the ability of the user equipment to the base station.

(17) A wireless communication method, including:

determining, according to an ability of a user equipment and/or a channel condition between the user equipment and a base station for non-terrestrial networks communication, an uplink transmission mode for the user equipment from among two or more uplink transmission modes, where the two or more uplink transmission modes respectively correspond to different ways of the user equipment obtaining uplink transmission parameters; and performing, based on the determined uplink transmission mode, uplink transmission from the user equipment to the base station.

(18) The wireless communication method according to (17), where the two or more uplink transmission modes includes:

a first mode, where the user equipment predefines an uplink parameter set corresponding to different satellite orbit information, or obtains an uplink parameter set by an uplink parameter calculation formula predefined corresponding to different satellite orbit information, and performs the uplink transmission using the uplink parameter set;

a second mode, where the user equipment obtains uplink transmission parameters according to an instruction from the base station, and performs the uplink transmission using the uplink transmission parameters; and a third mode, where the user equipment calculates the uplink transmission parameters according to its positioning information and satellite orbit information, and performs the uplink transmission using the uplink transmission parameters.

(19) The wireless communication method according to (18), where determination of the uplink transmission mode includes:

taking, for a user equipment with a Global Navigation Satellite System (GNSS) function, the third mode as a default mode; and taking, for a user equipment without the GNSS function, the first mode as a default mode.

(20) The wireless communication method according to (18), further including:

notifying the determined uplink transmission mode to the user equipment.

(21) The wireless communication method according to (18), further including:

notifying information related to the ability of the user equipment to the base station.

(22) A computer readable medium including executable instructions that, when executed by an information processing apparatus, cause the information processing apparatus to perform the method according to any one of (17) to (21).

The invention claimed is:

1. An electronic device for wireless communication, comprising processing circuitry configured to:

determine, according to an ability of a user equipment and/or a channel condition between the user equipment and a base station for non-terrestrial networks communication, an uplink transmission mode for the user equipment from among two or more uplink transmission modes, wherein the two or more uplink transmission modes respectively correspond to different ways of the user equipment obtaining uplink transmission parameters; and perform control to perform, based on the determined uplink transmission mode, uplink transmission from the user equipment to the base station, wherein the two or more uplink transmission modes comprise:

a first mode, in which the user equipment predefines an uplink parameter set corresponding to different satellite orbit information, or obtains an uplink parameter set by an uplink parameter calculation formula predefined corresponding to different satellite orbit information, and performs the uplink transmission using the uplink parameter set;

a second mode, in which the user equipment obtains uplink transmission parameters according to an instruction from the base station, and performs the uplink transmission using the obtained uplink transmission parameters; and a third mode, in which the user equipment calculates uplink transmission parameters according to its positioning information and satellite orbit information, and performs the uplink transmission using the calculated uplink transmission parameters.

2. The electronic device according to claim 1, wherein in the first mode, the user equipment cyclically transmits uplink signals at a predetermined time interval using one or more predefined uplink parameter sets or one or more uplink parameter sets calculated by a predefined calculation formula.

3. The electronic device according to claim 1, wherein the instruction comprises transmission power control (TPC) information for instructing an uplink transmission power and/or timing advance (TA) information for instructing advance of uplink transmission timing.

4. The electronic device according to claim 1, wherein the positioning information comprises a position and a speed of the user equipment, and the uplink transmission parameters comprise one or more of the following parameters: an uplink transmission power, an uplink Doppler shift compensation, and uplink timing advance.

5. The electronic device according to claim 1, wherein the satellite orbit information comprises a mobility type of a satellite, the mobility type being determined according to at least a part of ephemeris information of the satellite.

6. The electronic device according to claim 5, wherein the at least a part of ephemeris information comprises altitude information and inclination angle information of the satellite.

7. The electronic device according to claim 5, wherein a corresponding relationship between the mobility type of the satellite and the satellite orbit information are known by both the base station and the user equipment.

8. The electronic device according to claim 5, wherein the mobility type of the satellite is broadcasted by the base station and received by the user equipment for obtaining the satellite orbit information.

9. The electronic device according to claim 1, wherein determination of the uplink transmission mode comprises:
taking, for a user equipment with a Global Navigation Satellite System (GNSS) function, the third mode as a default mode; and
taking, for a user equipment without the GNSS function, the first mode as a default mode.

10. The electronic device according to claim 1, operating as the base station, wherein the processing circuitry is further configured to perform control to notify the determined uplink transmission mode to the user equipment.

11. The electronic device according to claim 10, wherein the processing circuitry is configured to notify configuration and/or replacement of the uplink transmission mode in one or more ways of:
configuring or re-configuring by radio resource control (RRC) signaling;
semi-statically configuring by a media access control control element (MAC CE); and
dynamically configuring through downlink control information (DCI).

12. The electronic device according to claim 10, wherein the processing circuitry is configured to notify configuration and/or replacement of the uplink transmission mode in one or more of the ways of:
representing that the user equipment uses the third mode, when a value indicating uplink transmission parameters in configuration information with respect to uplink transmission is null; and
representing that the user equipment uses the second mode, when the value indicating uplink transmission parameters in the configuration information is not null.

13. The electronic device according to claim 10, wherein determination of the uplink transmission mode comprises:
changing, in a case where communication quality of the uplink transmission performed through the first mode or the third mode is lower than a predetermined level, the uplink transmission mode to the second mode; and
changing, in a case where a difference between uplink transmission parameters calculated through the third mode and uplink transmission parameters obtained by measuring uplink signals of the user equipment is greater than a predetermined level, the uplink transmission mode to the second mode.

14. The electronic device according to claim 1, operating as the user equipment, wherein the processing circuitry is further configured to:
perform control to notify information related to the ability of the user equipment to the base station.

15. A wireless communication method, comprising:
determining, according to an ability of a user equipment and/or a channel condition between the user equipment and a base station for non-terrestrial networks communication, an uplink transmission mode for the user equipment from among two or more uplink transmission modes,
wherein the two or more uplink transmission modes respectively correspond to different ways of the user equipment obtaining uplink transmission parameters; and
performing, based on the determined uplink transmission mode, uplink transmission from the user equipment to the base station,
wherein the two or more uplink transmission modes comprises:
a first mode, wherein the user equipment predefines an uplink parameter set corresponding to different satellite orbit information, or obtains an uplink parameter set by an uplink parameter calculation formula predefined corresponding to different satellite orbit information, and performs the uplink transmission using the uplink parameter set;
a second mode, wherein the user equipment obtains uplink transmission parameters according to an instruction from the base station, and performs the uplink transmission using the uplink transmission parameters; and
a third mode, wherein the user equipment calculates the uplink transmission parameters according to its positioning information and satellite orbit information, and performs the uplink transmission using the uplink transmission parameters.

16. The wireless communication method according to claim 15, wherein determination of the uplink transmission mode comprises:
taking, for a user equipment with a Global Navigation Satellite System (GNSS) function, the third mode as a default mode; and
taking, for a user equipment without the GNSS function, the first mode as a default mode.

17. The wireless communication method according to claim 15, further comprising:
notifying the determined uplink transmission mode to the user equipment, and/or
notifying information related to the ability of the user equipment to the base station.

18. A computer readable medium comprising executable instructions that, when executed by an information processing apparatus, cause the information processing apparatus to perform the method according to claim 15.

* * * * *